United States Patent [19]
Deely et al.

[11] Patent Number: 5,513,858
[45] Date of Patent: May 7, 1996

[54] SPLIT INTERLOCKING SEAL

[75] Inventors: Christopher M. Deely, West Roxbury, Mass.; Patrick W. McMahon, Kingston, N.H.

[73] Assignee: A. W. Chesterton Company, Stoneham, Mass.

[21] Appl. No.: 233,503

[22] Filed: Apr. 26, 1994

[51] Int. Cl.⁶ ..................................................... F16J 15/32
[52] U.S. Cl. .......................... 277/197; 277/193; 277/205; 277/218
[58] Field of Search ..................... 277/119, 123, 277/124, 125, 192, 197, 199, 205, 212 C, 216, 218, 220, 223, 136, 154, 155, 156, 193, 217

[56] References Cited

U.S. PATENT DOCUMENTS

| | | | |
|---|---|---|---|
| 1,201,488 | 10/1916 | Miller | 277/125 |
| 1,865,566 | 7/1932 | Hodge | 277/197 |
| 2,006,602 | 7/1935 | Muster | 277/124 |
| 3,915,463 | 10/1975 | Pippert | 277/205 |
| 3,991,455 | 11/1976 | Bergeron | 277/197 |
| 4,145,057 | 3/1979 | Wheeler | 277/205 |
| 4,157,833 | 6/1979 | Kozlowski | 277/124 |
| 4,169,604 | 10/1979 | Heathcott | 277/124 |
| 4,519,617 | 5/1985 | Butler | 277/125 |
| 4,592,558 | 6/1986 | Hopkins | 277/205 |
| 4,615,531 | 10/1986 | Green | 277/197 |
| 4,807,890 | 2/1989 | Gorman et al. | 277/205 |

*Primary Examiner*—Daniel G. DePumpo
*Attorney, Agent, or Firm*—Hill, Steadman & Simpson

[57] ABSTRACT

A seal for a shaft is provided having a pair of back-to-back seal members. The seal members each have at least one split therein, although the seal members are positioned against each other so that the splits are staggered. Alternatively, one seal member is aligned back-to-back with a backing ring in a similar manner. Ends adjacent each split are interlocked to the opposite seal member or the backing ring by a post and hole engagement means.

11 Claims, 1 Drawing Sheet

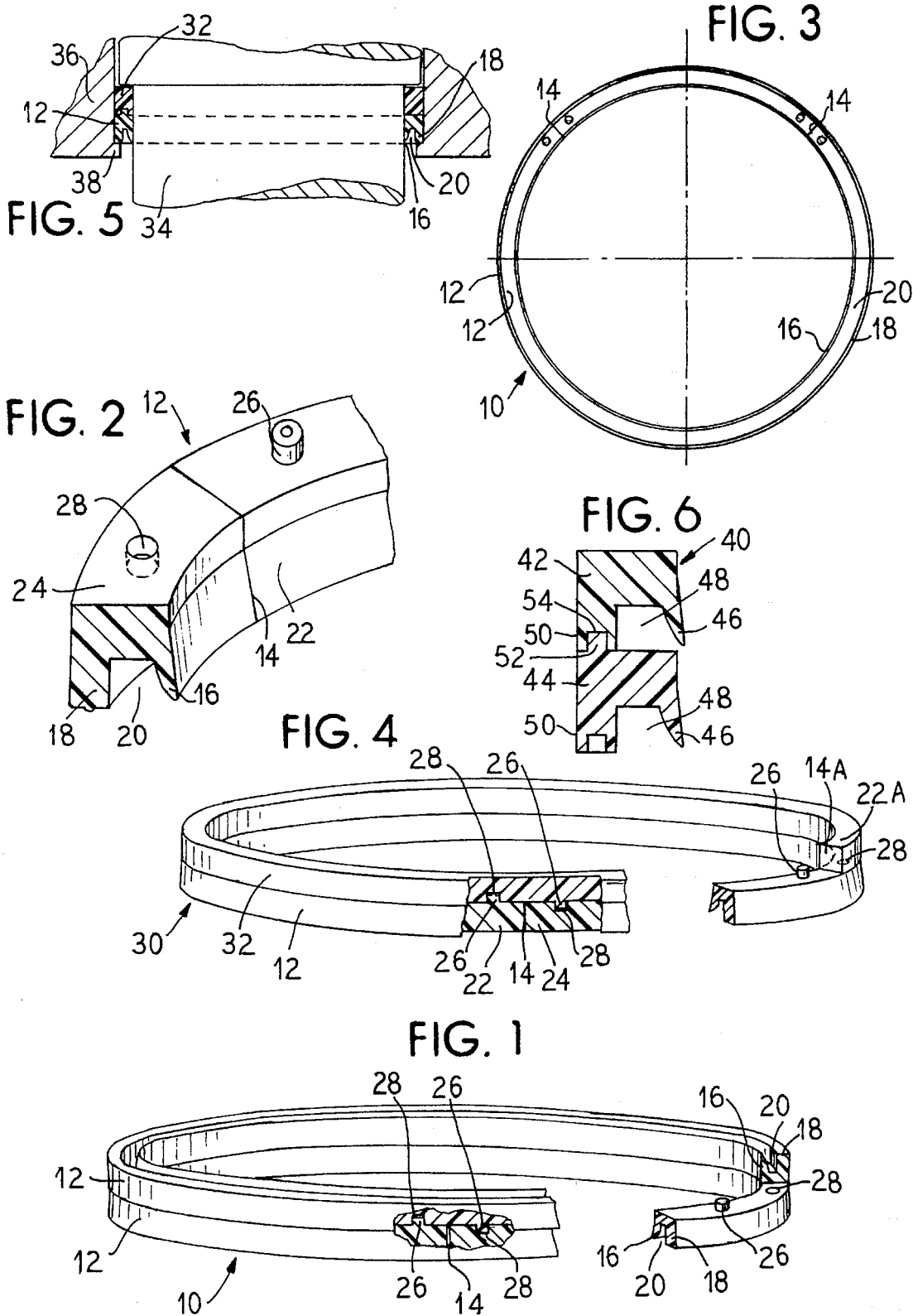

SPLIT INTERLOCKING SEAL

BACKGROUND OF THE INVENTION

The present invention relates generally to seals. More particularly, the invention relates to fluid seals disposed around a moving shaft.

Seals are generally known for preventing fluid leakage around a shaft which is rotating or reciprocating. A particular example is a water turbine which has an annular seal disposed around a rotating shaft. Water turbines are used in dams for powering electric generators. Such a turbine can be quite sizeable, and can have a massive shaft that is several feet in diameter.

Many turbines have variable pitch vanes. A mechanism for rotating the vanes is housed inside the shaft. This mechanism requires lubrication. Furthermore, the shaft rides on bearings which must also be lubricated. In order to lubricate these components, it is desirable to provide a lubricant around a portion of the shaft. However, it is undesirable for the lubricant to mix with water around the shaft near the vanes.

Therefore, it is necessary to provide a seal around a rotating turbine shaft to prevent water flow around the shaft from a vane portion of the turbine. It is also necessary to provide a seal to prevent the flow of lubricant from a lubricated portion of the shaft.

Because of the great size and mass of water turbine components, it has been a problem to replace worn seals around a shaft. Disassembling turbine components is difficult and time consuming. Furthermore, it is highly inefficient to remove a turbine shaft only to replace an annular seal.

As an attempted solution, it has been known to provide a "split" seal. Such a seal has a split, or separation so that the seal is not a continuous annular piece, but rather has ends that must be connected by some means, such as with an adhesive. Use of such a seal allows replacement around a shaft without major disassembly of surrounding equipment.

Unfortunately, traditional split seals often fail at the split portion. Such a failure can result in a small leakage or a complete breakage altogether. Therefore, a need exists for a split seal that has a strong connection at the split.

Furthermore, water turbine shaft seals, if disposed on a horizontal axis, have a tendency to wear at the bottom. Because of the great weight and forces within a water turbine, present bearing assemblies are incapable of completely preventing this effect. Therefore, a need exists for a seal which can be repaired in only a worn section.

Seals referred to as "lip" seals are generally known in the art. Such seals have an annular channel in the side thereof. Formed around the channel is an inner lip and an annular boss. The channel is configured to be open to pressurized fluid. This pressure on the interior of the channel forces the inner part of the seal inward and the outer part of the seal outward, enhancing the sealing effect.

A lip seal can be one-sided or two-sided. A one-sided lip seal has an annular channel on one side; a two-sided lip seal has an annular channel on each side.

Also, it is known to provide a rigid backing ring behind a one-sided lip seal to retain a seal's shape or for securing a seal in position.

SUMMARY OF THE INVENTION

The present invention overcomes the problems of the prior art by providing an improved annular seal for a shaft where the seal has interlocking, staggered components. To this end, in an embodiment, a seal for a shaft is provided. The seal has an annular first member which has at least one first split. The first split defines two ends. An annular second member is also provided which has at least one second split. The second split also defines two ends. A means is associated with each end for engagement between the first member and the second member so that each first split is staggered from each second split.

In an embodiment, an inner lip and an annular boss define an annular channel disposed in a side of said annular first member.

In an embodiment, an inner lip and an annular boss define an annular channel disposed in a side of said annular second member.

In an embodiment, the second member is a rigid backing ring.

In an embodiment, the means associated with each end for engagement is a post on the first member configured to be received in a hole in the second member.

In an embodiment, the means associated with each end for engagement is a post on the second member configured to be received in a hole in the first member.

In an embodiment, the ends are bonded together by an adhesive.

In an embodiment, a seal for a shaft is provided including an annular seal member having at least one split. Each split defines two ends. An annular backing ring is also provided with a means associated with each end for cooperative engagement between the seal member and the backing ring.

In an embodiment, a seal is provided having a first annular seal member comprising one or more first segments. The first segments each have two first ends. The seal also includes a second annular seal member comprising one or more second segments. The second segments each have two second ends. The first annular seal member is interlockably engageable back-to-back with the second annular seal member so that the first ends and second ends are staggered.

An advantage of the present invention is that it provides a shaft seal having a split that resists separation.

Another advantage of the present invention is that it provides a shaft seal that can be replaced without removal of the shaft.

A further advantage of the present invention is that it provides a shaft seal that allows replacement of only a portion of the seal.

Additional features and advantages of the present invention are described in, and will be apparent from, the detailed description of the presently preferred embodiments as well as the drawings.

BRIEF DESCRIPTION OF THE DRAWINGS

FIG. 1 illustrates a perspective view of a two-sided lip seal according the present invention having portions cut away.

FIG. 2 illustrates a partial view of a separation in a seal according to the present invention.

FIG. 3 illustrates a top plan view of a seal of the present invention.

FIG. 4 illustrates a perspective view of a one-sided lip seal having portions cut away, according to an alternative embodiment of the present invention.

FIG. 5 illustrates a partial sectional side view of a seal around a shaft, having portions cut away.

FIG. 6 illustrates a sectional view of an alternative embodiment of the present invention.

DETAILED DESCRIPTION OF THE PRESENTLY PREFERRED EMBODIMENTS

Referring to the drawings, FIG. 1 illustrates a preferred embodiment of the present invention which is generally a two-sided lip seal 10. In the preferred embodiment, the seal 10 includes two annular seal members 12. The seal members 12 generally of the same dimension and are preferably like parts. The seal members 12 are configured to be disposed around a shaft.

Each seal member 12 includes at least one split 14. Because the seal members 12 are split, they can be installed around a shaft without having to be slipped over an end of the shaft.

Preferably, each seal member 12 includes an inner lip 16 and an annular boss 18. A channel 20 is formed between the inner lip 16 and the annular boss 18. The inner lip 16 is configured to provide a sealing contact with the shaft. The annular boss 18 is preferably configured to be seated in an annular recess in a housing which surrounds the shaft.

In the preferred embodiment illustrated in FIG. 1, the seal members 12 are arranged back-to-back so that the channels 20 are directed away from one another. Also, the seal members 12 are arranged so that the splits 14 are staggered.

The split 14 of each seal member defines a first end 22 and a second end 24. At each end 22, 24 a means is provided for interlocking the two seal members 12 together. The means preferably includes a post 26 and associated hole 28 arrangement. Each hole 28 is configured to complimentarily receive its associated post 26.

Preferably, at each split 14, one end 22 defined thereby has a post 26 extending therefrom, while the end 24 has a hole 28 therein, as illustrated in FIG. 2. Referring back to FIG. 1, the post 26 extending from end 22 has an associated adjacent hole 28 in the opposite seal member 12. Similarly, the hole 28 in the end 24 has an associated post 26 extending adjacently from the opposite seal member. The posts 26 and associated holes 28 can be reversed, so long as a cooperative interlocking arrangement is provided. Alternatively, another shape of male-female interlocking engagement of projection and receptacle could be used. The means for interlocking engagement can either be molded directly in the seal members 12 or subsequently constructed, such as by drilling the holes 28 and by bonding the posts 26.

Because the splits 14 of opposite seal members 12 are staggered, each set of associated ends 22 and 24 are interlocked by posts 26 and holes 28 with a contiguous portion of the opposite seal member 12. This prevents separation of the split 14. Furthermore, the staggered-split arrangement helps prevent leakage through the seal 10 in the event that fluid seeps into the split 14.

As illustrated by FIG. 3, where each seal member 12 has one split 14, the staggering arrangement is preferably such that the split 14 of one seal member 12 is aligned at approximately a ten-o'clock position, while the split 14 of the opposite seal member 12 is aligned approximately at a two-o'clock position.

The seal 10 can be used with a shaft, such as the rotating shaft of a water turbine (not shown). The inner lips 16 contact the shaft, while the annular boss 18 are disposed in an annular recess in a housing which surrounds the shaft. In a water turbine, one side of the seal 10 would be subjected to water and the opposite side would be subjected to a fluid lubricant.

Turning to FIG. 4, an alternative embodiment of the invention is illustrated. In this embodiment, a one-sided lip seal 30 is provided. The seal 30 includes an annular seal member 12 generally like that of the preferred embodiment, except it is arranged back-to-back with a backing ring 32 so that the channel 20 is directed away from the backing ring 32. The backing ring 30 adds rigidity to the seal member 12. The backing ring 30 is preferably made of metal, but can be made of some other rigid material, such as plastic.

As in the two-sided seal 10, the seal member 12 of the one-sided seal 30 has at least one split 14. Preferably, the backing ring 32 also has at least one split 14A. The seal members 12 is positioned against the backing ring 32 so that the splits 14 and 14A are staggered.

The split 14A of the backing ring 32 defines a first end 22A and a second end. At each seal member end 22, 24 a means is provided for interlocking the seal members 12 to the backing ring 32. The means preferably includes a post 26 and associated hole 28 arrangement, as described above and as illustrated in FIG. 2. Each hole 28 is configured to complimentarily receive its associated post 26. For each post 26 extending from the seal member 12, a hole is provided adjacently on the backing ring 32, and vice-versa. Similarly, for each split 14A in the backing ring 32, there is a post 26 and hole 28 engagement between each end of the split 14A and the seal member 12. As in the two-sided seal 10, for the one-sided seal 30, another shape of male-female interlocking engagement could be used.

Because the split 14 of seal member 12 is staggered from the split 14A of the backing ring, each split of the seal member 12 is interlocked by posts 26 and holes 28 across a contiguous portion of the backing ring. This prevents separation of the split 14. Furthermore, the staggered-split arrangement helps prevent leakage through the seal 30 in the event that fluid seeps into the split 14.

Where the seal member 12 has one split 14 and the backing ring 32 has one split 14A, the staggering arrangement is preferably such that the split 14 is positioned at approximately a ten-o'clock position, while the split 14A of the backing ring 32 is positioned approximately at two-o'clock.

FIG. 5 illustrates the one-sided lip seal 30 disposed around a shaft 34. A housing 36 surrounds the shaft 34 with the seal interposed therebetween. The inner lip 16 of the seal member 12 is in sealable contact with the shaft 34, while the annular boss 18 is positioned in a recess 38.

In both the two-sided seal 10 and the one-sided seal 30, the annular boss 18 of each seal member 12 is disposed in a housing recess. For this reason, it is preferred that the annular boss 18 is slightly wider than the inner lip 16 to provide an area for fluid to flow into the channel 20.

Pressure from the fluid in the channel 20 forces the inner lip 16 inward against the shaft and, to some extent, pushes the annular boss 18 against the recess, enhancing the sealing effect. Furthermore, the interlocking post 26 and hole 28 engagement means is tightened, resisting separation of the split 14.

When installed around a shaft, it is preferred that the split 14 of the seal members 12 be joined and reinforced by an adhesive. Adhesive is also preferably applied between the back-to-back seal members 12. Cyanoacrylate is a suitable adhesive for many seal materials.

Where the seal member 12 has one split 14, the seal member 12 is essentially a single segment. However, a seal member 12 can have more than one split 14. In such an embodiment, the seal member 12, thus, is comprised of multiple segments. Interlocking engagement means are provided in association with each split 14. This embodiment permits selective replacement of a single segment.

A multiple-segment configuration can be beneficial in an application where wear is repeatedly greater on one portion of the seal member. For example, such a condition can happen in a water turbine from the weight of a large, heavy horizontal shaft acts downward, affecting the seal member 12.

The seal 10 and seal 30 can each be used to seal around a rotating shaft or an axially reciprocating shaft. In conjunction with a reciprocating shaft, the seal 10, 30 is known as a wiper. The seals 10 and 30 provide a sealing effect in a static condition as well.

On a reciprocating shaft, a V-ring stack type of bearing set can be used. The described two-sided seal 10 uses less space than a traditional seal. Therefore, the present invention provides an advantage of greater bearing space.

The seal members 12 of the present invention are constructed of a flexible material. Therefore, as fluid pressure acting within the channel 20 increases, the inner lip 16 presses against the shaft with greater force and area. On a two-sided lip seal 10, this can cause a torque action between the two seal member 12. Because the seal members 12 are flexible, if the two members 12 are not adequately secured together, they can tend to creep apart out of alignment. Therefore, an embodiment of the invention provides for multiple interlocking means between the annular seal members 12. Preferably, each multiple interlocking means, such as a post and hold combination, is spaced at a repeating angular interval around the circumference of the seal.

Such an arrangement maintains the radial and circumferential alignment of the two engaged seal members 12. Furthermore, such an arrangement can be used with or without any splits 14 in the seal members 12.

Preferably, to provide assembly options to a user, the multiple means for interlocking, such as posts and holes, are complimentarily uniformly spaced circumferentially and standardized among seal member 12 components. For instance, if enough means are provided, a single piece seal member 12 could be replaced by one having multiple segments, etc.

Another benefit of having a seal 10 with multiple interlocking means around its circumference is that the added stiffness makes the seal 10 easier to install in a confined space.

Referring to FIG. 6, an alternative embodiment of the invention provides a chevron-type seal 40. The seal 40 includes a first seal member 42 and a second seal member 44. The first 42 and second 44 seal members each have a lip 46, a channel 48, and an annular boss 50. The first 42 and second 44 seal members are interlockably engaged by a post 52 and hole 54 arrangement on the annular bosses 50 so that the channel 48 of each seal member 42, 44 is facing the same direction.

Understandably, various changes and modifications to the presently preferred embodiments described herein will be apparent to those skilled in the art. Such changes and modifications can be made without departing from the spirit and scope of the present invention and without diminishing its intended advantages. Therefore, the appended claims are intended to cover such changes and modifications.

What is claimed is:

1. A seal for a shaft comprising:

an annular first member having at least one first split, each said first split defining two ends;

an annular second member having at least one second split, each said second split defining two ends;

means disposed adjacent each end for engagement between said first member and said second member for relatively annularly positioning said first and second members so that each said first split is staggered from each said second split, each split having two of said means, respectively disposed on opposite sides of that split, for resisting separation of said ends of said split.

2. A seal according to claim 1 wherein said means includes a projection and receptacle.

3. A seal according to claim 2 further comprising an inner lip and an annular boss defining an annular channel disposed in a side of said annular first member.

4. A seal according to claim 2 further comprising an inner lip and an annular boss defining an annular channel disposed in a side of said annular second member.

5. A seal according to claim 2 wherein said second member is a rigid backing ring.

6. A seal according to claim 2 wherein said ends are bonded together by an adhesive.

7. A seal according to claim 1 wherein said means associated with each end for engagement is a post on said first member configured to be received in a hole in said second member.

8. A seal according to claim 1 wherein said means associated with each end for engagement is a post on said second member configured to be received in a hole in said first member.

9. A seal for a shaft comprising:

a first annular seal member having a first inner lip, a first annular boss and a first annular channel between said first inner lip and first annular boss;

a second annular seal member having a second inner lip, a second annular boss and a second annular channel between said second inner lip and said second annular boss;

a plurality of means for interlocking said first and second members together with said first channel of said first member and said second channel of said second member facing opposite directions, each said means including a projection and an associated hole; and wherein said plurality of means being spaced from one another by a repeated angular interval.

10. A seal according to claim 9 wherein said first annular seal member has at least one split therein.

11. A seal according to claim 9 wherein said second annular seal member has at least one split therein.

* * * * *